United States Patent Office 3,420,741
Patented Jan. 7, 1969

3,420,741
METHOD FOR THE PREPARATION OF
SALICYLIC ACID
Martin H. Rogoff, Highland Park, Ill., assignor to International Minerals & Chemical Corporation, a corporation of New York
No Drawing. Continuation of application Ser. No. 452,903, May 3, 1965. This application Jan. 29, 1968, Ser. No. 701,134
U.S. Cl. 195—28          11 Claims
Int. Cl. C12b 1/00

ABSTRACT OF THE DISCLOSURE

In the fermentative production of salicylic acid in which a strain of Pseudomonas is cultivated in an aqueous medium at pH 5.5 to 8, the medium contains naphthalene, an assimilable nitrogen source, and an assimilable phosphorus source. In accordance herewith salicyclic acid production is increased by altering the proportion of the Pseudomonas cell population to accumulate salicylic acid in the medium during the course of the fermentation to restore a balance which provides increased salicylic acid yields.

Specification

This application is a continuation of application Ser. No. 452,903, filed May 3, 1965, and now abandoned.

The present invention relates to an improved method for preparing salicylic acid, and more particularly to an improved method wherein relatively high yields of salicylic acid advantageously are produced by a fermentation of naphthalene.

Salicylic acid is a highly valuable compound which has found wide-spread utilization in many areas of chemical technology. Techniques heretofore available for preparing salicylic acid generally have entailed the utilization of relatively involved chemical synthesis in which intermediate compounds are subjected to a catalyzed oxidation to provide the desired hydroxy aromatic carboxylic acid. Although such techniques usually advantageously employ relatively inexpensive and available starting materials, with the exception of the catalysts, problems of catalyst and other process control with the attendant operating and investment expenditures have somewhat detracted from the overall commercial attractiveness of these methods. It further has been suggested to produce salicylic acid by fermentation of an appropriate starting material, such as naphthalene, with a microorganism. The approaches employing a fermentation method, however, heretofore have not provided sufficiently high yields of salicylic acid to render these methods commercially feasible. In the main, maximum salicylic acid production corresponding to about 15 milligrams per milliliter of final fermentation broth have been obtained in the previously described fermentation approaches.

Accordingly, it is the primary object of the present invention to provide an improved method for preparing salicylic acid.

It is an additional object of the present invention to provide an improved method for producing salicylic acid by an efficient fermentation of a relatively inexpensive and readily available starting material.

Another object of the present invention is to provide an improved method for preparing salicylic acid by the fermentation of naphthalene wherein significantly higher yields of salicylic acid are obtained than heretofore observed in fermentation processes of a similar purpose.

A further object of the present invention is to provide a method for preparing salicylic acid by the fermentation of naphthalene wherein efficient control of salicylic acid production may be obtained by a relatively simple maintenance and/or adjustment of the operating conditions.

It is a particular object of the present invention to provide an efficient and relatively inexpensive method for preparing salicylic acid wherein conversion of naphthalene to salicylic acid is carried out by the fermentation of naphthalene with a microorganism which advantageously allows the utilization of inexpensive nutrient media and which with a relatively simple maintenance and/or adjustment of the fermentation broth composition provides a significantly higher production of salicylic acid than fermentation techniques of a similar purpose heretofore available.

Broadly described, the present invention provides a method for preparing salicylic acid which comprises cultivating a microorganism which is a salicylic acid-producing strain of Pseudomonas in an aqueous nutrient medium having a pH in the range of from about 5.5 to about 8 and containing naphthalene, an assimilable nitrogen source, and an assimilable phosphorus source to produce salicylic acid in the resultant fermentation broth, and after the initiation of said salicylic acid production, altering the proportion of salicylic acid to the cell population of said microorganism in the resultant fermentation broth to a value which results in an increase in total salicylic acid production over that which normally results in the absence of said proportion alteration.

By means of the method of the present invention salicylic acid may be produced from naphthalene in a simple, efficient and economical manner. The discovery upon which the present invention is bottomed, i.e., the increased salicylic acid-production response of salicylic acid-producing strains of Pseudomonas to appropriate adjustments of the relative concentration of salicylic acid (as compared to microorganism cell population) during the fermentation, advantageously allows significantly increased total production of salicylic acid from naphthalene to be obtained than hereinbefore possible. Specifically, due to the use of the described fermentation broth composition adjustment and maintenance salicylic acid productions of 20 milligrams per milliliter and above may be obtained as compared to the 5 to 15 milligrams per milliliter achieved in previously suggested fermentation techniques.

The present invention contemplates the utilization of any salicylic acid-producing microorganism of the genus Pseudomonas. Specific examples of such microorganisms include, without limitation, strains of Pseudomonas fluorescens, Pseudomonas aeruginosa, Pseudomonas salopia, Pseudomonas desmolytica, Pseudomonas rathonis, Pseudomonas cruciviac, Pseudomonas dachunac, and Pseudomonas arvilla. The more preferred microorganism for utilization is Pseudomonas fluorescens, typified by Pseudomonas fluorescens, Bioferm Strain No. 345–E, isolated from oil ditch drainage water.

The fermentation media employed in the present method constitute those which are capable of supporting growth of the above-described microorganisms and which comprise naphthalene, an asimilable nitrogen source, and an assimilable phosphorus source.

The naphthalene raw material employed in the fermentation of the present process suitably may be a crude or refined naphthalene such as a naphthalene fraction recovered from crude hydrocrabon mixtures such as petroleum, coal, shale oil, and the like. A particular advantage of the present method is that crude naphthalene containing such impurities as alkyl naphthalenes, thiophene, benzthiophene, cresols, and the like, suitably may be employed without any appreciable sacrifice in the attainable salicylic acid production. This advantage is particularly realized in embodiments wherein the salicylic acid-producing microorganism is *Psudomonas fluorescens*, Bioferm Strain No. 345–E.

In the initial fermentation medium the naphthalene concentration generally is in the range of from about 0.4 to about 4% and higher, preferebaly from about 0.5 to about 2.5% by weight of the total medium. In preferred embodiments of the method the naphthalene concentration throughout the fermentation is maintained at an excess, which generally corresponds to the naphthalene concentration of over about 0.2% by weight. Consequently, throughout the fermentation additional naphthalene continuously or incrementally may be, and preferably is, added to the medium at an average rate of generally about 0.05–0.15% per hour.

The assimilable nitrogen source suitably may be provided by any inorganic or organic nitrogenous substance conventionally employed in fermentation processes. Specific examples of such materials include ammonia, urea, ammonium compounds such as ammonium hydroxide, ammonium chloride, ammonium nitrate, ammonium sulfate, ammonium phosphate, and the like, the nitrates of alkali and alkaline earth metals, e.g., sodium, potassium, lithium, calcium, barium and magnesium nitrates, proteinaceous materials such as soybean meal, cottonseed meal, casein, autolyzed yeast and the like, and hydrolyzates and nitrogen-containing extracts of hydrolyzates of said proteinaceous materials. Complex organic nitrogen-containing materials are less preferred for utilization with the preferred nitrogen sources being supplied by inorganic ammonium compounds, such as ammonium hydroxide.

In the initial fermentation medium, the concentration of the nitrogen source suitably may vary but generally is in the range of from about 0.1 to about 3% and higher, preferably from about 0.5 to about 1.5% by weight of the total medium.

The invention contemplates the utilization of any inorganic or organic assimilable phosphorus source. Specific examples of suitable substances include inorganic phosphate derivatives such as phosphoric acid, ammonium phosphate, alkali metal, alkaline earth metal and other metal phosphates, such as sodium, potassium, calcium, magnesium and manganese phosphates and hydrogen phosphates, and organic phosphate-containing materials such as lecithin, nucleotides, phytic acid and the like. Inorganic phosphate derivatives constitute the preferred phosphorous sources. Although the concentration of the phosphorus source suitably may vary, the initial nutrient medium generally contains from about 0.05 to about 1% and higher, preferably from about 0.075 to about 0.2% by weight of the phosphorus source.

The initial medium employed in the present method also suitably may contain small amounts of secondary mineral nutrients which generally are inorganic metal salts in the form of the chlorides, nitrates, sulfates, phosphates and the like of sodium, potassium, calcium, magnesium, manganese, zinc, iron, copper, cobalt and the like. Such secondary nutrients may be added separately or may be present in complex nutrients utilized as the nitrogen and/or phosphorus source.

The initial frementation medium further preferably contains a buffering agent to adjust the initial pH to a value in the range of from about 5.5 to about 8, preferably about 6.0 to about 7.5. Suitable buffering agents include calcium carbonate, sodium hydrogen phosphates, potassium hydrogen phosphates, ammonium hydrogen phosphates, and the like.

In the present method, a particularly advantageous initial fermentation medium is an aqueous system containing from about 0.5 to about 2.5% by weight naphthalene, from about 0.5 to about 1.5% by weight ammonium hydroxide, from about 0.075 to about 0.2% by weight phosphoric acid, and calcium carbonate in an amount to buffer the medium to a pH of from about 6.0 to about 7.5.

In accordance with the present method, a suitable initial aqueous nutrient medium initially is inoculated with a strain of the salicylic acid-producing microorganism. The initial nutrient medium previously may have been sterilized but such preliminary sterilization is not necessary. The amount of the inoculum employed in the inoculation step suitably may vary but generally is in the range of from about 1 to about 10% by volume of the starting fermentation medium.

A suitable inoculum may be prepared by any conventional technique known to those skilled in the fermentation art. An example of a satisfactory inoculum preparation entails transferring a 30 to 45 day-old culture of the microorganism on an agar slant to 100 cc. of sterilized nutrient medium and incubating the sample at about 30° C. for about 72 hours with agitation on a rotary shaker. About 5% by volume of the resultant culture then is transferred to an additional 100 cc. of the nutrient medium and incubated for about 48 hours at about 30° C. with the agitation being continued. The final step in the inoculum preparation then is carried out by transferring about 2.5% by volume of the resultant culture to five gallons of the nutrient medium buffered to a pH of about 6.8 to about 7.2 and incubating the resultant medium at about 30° C. for 15 to 25 hours with submerged aeration and with the pH of the medium throughout the incubation period being maintained at about 6.7 by an addition of sodium hydroxide.

Following inoculation of the fermentation production medium, the salicylic acid-producing microorganism is allowed to grow therein under submerged aerated conditions to produce salicylic acid. In accordance with the present method the resultant fermentation generally is carried out at a temperature in a range of from about 20 to 40° C., preferably from about 25 to 35° C. Oxygen, usually in the form of air, is introduced into the system at an excess of the observed oxygen consumption which generally provides a feed rate to the system in the range of from about 0.5 to about 2 standard cubic feet air per minute. Agitation of the system suitably may be carried out by conventional mechanical equipment.

During the initial phases of growth of the microorganism in the nutrient medium an increase in the cell population of the microorganism is attended by a decrease in the concentration of the respective naphthalene, nitrogen, and phosphorus sources and an increase in the concentration of salicylic acid. As indicated above, in preferred embodiments of the method to maintain naphthalene concentration at a more favorable level, additional naphthalene, either continuously or intermittently, is added to the medium. Unhindered, the pH of the fermentation broth decreases as the fermentation proceeds due in part to the production of salicylic acid. Preferably, a suitable base such as sodium hydroxide, potassium hydroxide, or ammonium hydroxide is added as necessary to maintain the pH above about 5.5 and preferably between about 6.0 and about 7.5.

Under normal circumstances it has been observed that in fermentations of the initial fermentation medium with the salicylic acid-producing strains of Pseudomonas, the salicylic acid accumulation is observed to reach a maximum after which point a period follows in which the salicylic acid concentration of the medium remains essentially constant or even decreases. At the above-described conditions, such a peak in the salicylic acid production generally occurs at a salicylic acid concentration of approximately 15 milligrams per milliliter of the resultant medium. It has been found that such a "peaking" phenomenon advantageously may be avoided by effecting an adjustment of the resultant proportion of salicylic acid in the fermentation broth to the total cell population of the microorganism.

Accordingly, in accordance with the present method, after the initiation of the microorganism growth and attending production of salicylic acid in the fermentation medium, one or several of the hereafter described techniques are employed to effect an appropriate adjustment of the ratio of salicylic acid concentration to microorganism cell population in the medium to enable total salicylic acid production to exceed that which normally would occur without such an adjustment in the composition of the resultant fermentation broth.

The method contemplates making the described broth composition adjustments at any time after the initiation of the salicylic acid production. The adjustment suitably may be carried out either before or after the salicylic acid rate of production in the broth decreases. Preferably, the adjustments in accordance with the present method are carried out to maintain the medium in a salicylic acid-producing state, more preferably to maintain the medium in a state wherein salicylic acid production is essentially continuous and is at least at a rate of about 0.1, preferably at least about 0.3 milligram salicylic acid per milliliter per hour. It will be understood that the described adjustments in broth composition, of course, suitably may be executed periodically or continuously.

The proper selection of the technique to be utilized in effecting the necessary adjustment of the fermentation composition depends upon the particular nature of the broth upon which the adjustment is to be carried out. The end result to which the adjustment is directed is to maintain essentially continuing salicylic acid-producing cell growth in the broth. An over-balance in the microorganism cell population as compared to the salicylic acid present results in the consumption of salicylic acid by the growing cells in the broth. On the other hand, a deficiency in the cell population as compared to the salicylic acid concentration results in a discontinuation of cell growth and even a diminishment of the viable cell population. In the more preferred embodiments of the invention the broth composition maintenance is carried out to achieve a broth containing from about $1 \times 10^8$ to about $1 \times 10^{11}$ cells per milliliter and producing salicylic acid at a rate of from about 0.3 to about 0.6 milligram per milliliter per hour. A particular feature of the present invention is that even after salicylic acid accumulation in the broth has reached a value of over about 10 milligrams per milliliter, salicylic acid production rates of over about 0.3, e.g., 0.4–0.6, milligram per milliliter per hour may be achieved.

In instances wherein an ultimate system is attained, or would be obtained if left alone, wherein continued cell growth is or would be due to an over-abundance in the cell population as compared to salicylic acid concentration, the desired medium adjustment suitably may be carried out by either removing a portion of the cells present, an addition to the medium of extraneous salicylic acid or a combination thereof. Embodiments wherein broth adjustment is to be accomplished in such a manner will be indicated in a test run or during the actual run by continuing cell growth being accompanied by a decrease in the salicylic acid accumulation of the broth. Such removal of a portion of the microorganism cell population suitably could be achieved by partial filtration, centrifugation and resuspension and the like. Adjustment by the addition of salicylic acid suitably may be effected by an addition of salicylic acid values in the form of free salicylic acid, salicylic acid anhydride, or water-soluble salicylic acid salts, e.g., ammonium salicylate, sodium salicylate, potassium salicylate, and the like.

The exact amounts of microorganism cells required to be removed and/or the salicylic acid required to be added in particular embodiments of the method will vary depending primarily upon the particular nutrient medium and microorganism strain employed. Accomplishment of the desired broth composition adjustment can be evidenced by a continuation or resumption in salicylic acid production, as the case may be, depending upon whether such adjustment is carried out preliminary or subsequent to any discontinuation in such production.

In those cases wherein the ultimate fermentation broth desired to be adjusted in accordance with the method in the invention is characterized, or would be characterized if not adjusted, by a deficiency in the microorganism cell population as compared to salicylic acid concentration, the requisite broth composition adjustment may be carried out by either adding a cell growth-promoting complementary nutrient composition to the broth, removing salicylic acid from the broth, or a combination thereof. Embodiments wherein broth composition adjustment is to be carried out by such means will be manifested in a test run or during the actual run by an interruption in an increase in the cell population of the broth.

Wherein adjustment is carried out by the addition of a cell growth-promoting complementary nutrient composition, the nutrients contain assimilable carbon, assimilable nitrogen and assimilable phosphorus sources. Although such an adjustment suitably may be carried out by an addition of the nutrients utilized in the initial fermentation medium and such adjustment is effected in certain continuous embodiments, in preferred embodiments the complementary nutrient composition added at this point in the process is considerably richer in the necessary nutrient sources than those initially employed to, in effect, "spark" cell growth immediately upon their addition. Specific examples of such richer nutrients include, without limitation, carbon, nitrogen, and phosphorus-containing compositions such as corn steep liquor, trypticase, soybean hydrolyzate, hydrolyzed yeast extract, cottonseed endosperm flour, beef extract, and the like.

An alternative removal of the salicylic acid present suitably may be accomplished by incorporating into the broth to be adjusted a substance which is an absorbent or absorbent for salicylic acid. Specific embodiments of such materials include clay, carbon, zeolites, agar, gelatin, glue, ion exchange resins, and the like. The particular amount of cell growth-promoting nutrient required to be added and/or salicylic acid required to be removed in specific embodiments, of course, will vary depending, inter alia, upon the particular initial nutrient medium and microorganism strain utilized. An accomplishment of the requisite broth adjustment can be evidenced by an appropriate continuation or resumption in the microorganism cell growth depending upon the timeliness of the adjustment.

In accordance with the present method the actual time periods involved in the fermentations of specific embodiments will vary depending upon whether the described broth composition adjustment is carried out before or after an interruption in the desired cell growth or salicylic acid production and further upon the number of times such adjustment is carried out upon a particular starting medium. The invention contemplates embodiments wherein the process is carried out in a batch-wise manner with one or more such broth composition adjustments being made and embodiments wherein the process is carried out utilizing appropriately a continuous or intermittent feed of fresh nutrient medium and an intermittent or continuous removal of portions of the resultant broth produced with the aforedescribed broth composition adjustments being accomplished by one or both of such nutrient feeds and such broth portion removals. Utilizing one or both of such expedients, salicylic productions with continuing salicylic acid accumulation in the broth easily may be carried out essentially continuously in the present method over time periods of over about 40 hours and even between about 70 and about 160 hours and longer.

By means of the present invention it advantageously is possible to control salicylic acid production rates and total salicylic acid production. For example, production rates on the order of over 0.4, e.g., 0.5–1.3, milligrams salicylic acid per milliliter per hour may be achieved and salicylic acid production broths containing salicylic acid amounts ranging up to and over about 20, e.g., 25–30, milligrams per milliliter may be obtained.

Salicylic acid produced by the present method may be recovered from the final broth or portions thereof by any suitable technique. An example of such a technique entails centrifuging the salicylic acid-containing broth to remove cells and the like, and extracting the resultant liquor after cooling with an organic solvent such as acetone, alcohol, or ether. Such methods are readily available in the literature.

The method of the invention having been described above in detail, the following examples are presented to show additional specific embodiments thereof. The examples are given merely for illustration purposes and not by way of limitation.

In the experimental procedures employed by obtaining the data reported in the examples, runs were made by cultivating *Psuedomonas fluorescens*, Bioferm Strain No. 345–E, in either 500 cc. shake flasks employing 100 cc. of initial nutrient medium or in 5 liter stir jars utilizing two liters of initial nutrient medium.

In the shake flask runs the aqueous medum employed contained about 2% naphthalene, about 0.6% ammonium chloride, about 0.75% calcium carbonate, about 0.005% ferrous sulfate heptahydrate, about 0.0038% L-glycine, and about 0.0001% calcium pantothenate, the latter two ingredients being added as stabilizing agents. The inoculum employed was a 72 hour old culture transferred from a similar medium in an amount of about 10% by volume. The flasks were incubated at about 30° C. on a rotary shaker operating at about 250 r.p.m. with a 2″ vertical stroke.

In the tests carried out in the 5 liter stir jars the initial aqueous medium employed had the following composition:

| Ingredient: | Concentration, percent by weight |
|---|---|
| Naphthalene | 2.0 |
| $NH_4Cl$ | 0.6 |
| $CaCO_3$ | 0.75 |
| $FeSO_4 \cdot 7H_2O$ | 0.005 |
| $MgSO_4$ | 0.05 |
| $MnCl_2$ | 0.02 |
| $K_2HPO_4$ | 0.15 |
| $KH_2PO_4$ | 0.05 |

The inoculum employed was a 72-hour culture obtained from a control shake flask run in an amount of about 5% by volume. The medium was agitated by a vertical stirrer operated at about 200 r.p.m. and air was forced into the medium at a rate of about 0.6 std. cu. ft. per minute. The temperature of medium was maintained at about 30° C. and the pH was maintained at about 6.5 to 7.2 by the addition of sodium hydoxide.

Salicylic acid concentrations of samples were determined by adding one ml. of 1% $Fe(NH_4)_2SO_4 \cdot 12H_2O$ in 5% acetic acid to 9 ml. of a suitably diluted fermentation sample. The resulting purple color was read at 530 mµ on a Coleman spectrophotometer. Concentration of salicylic acid was determined from a standard curve obtained from known quantities of salicylic acid.

Unless otherwise indicated all percentages given in the examples are on a weight basis.

Example I

In order to determine the normal microorganism growth and salicylic acid accumulation characteristics, a run in a 5-liter stir jar was carried out as described above without any alteration of the fermentation broth composition, and the salicylic acid concentration of the resultant broth was determined at various time intervals. The results of this run are set forth below in Table 1.

TABLE 1

| Fermentation time hours: | Salicylic acid concentration mg. per ml. |
|---|---|
| 0 | 0 |
| 18 | 3.5 |
| 24 | 6 |
| 48 | 12.7 |
| 72 | 14 |
| 90 | 17 |
| 96 | 17 |
| 120 | 17 |
| 144 | 16.5 |
| 165 | 16.5 |

The above data indicate that under normal circumstances without any maintenance or alteration in the composition of the fermentation broth obtained, salicylic acid accumulation in the broth reached a maximum and then was observed to reach a maximum and appear to slightly decrease, manifesting a consumption of the acid in the latter stages of the fermentation.

Example II

To demonstrate the effects on salicylic acid production achieved by an adjustment and maintenance of the fermentation broth in accordance with the method of the invention, the procedure of Example I was repeated with the exceptions of (a) initially incrementally feeding a total of 0.05% corn steep liquor into the nutrient medium during the first 17 hours to cause an over-abundance of microorganism cells to be obtained (as compared to the cell population proportion which allows salicylic acid accumulation) and (b) after such over-abundance had been established, i.e., after about 90 hours, adding 10 mg. per ml. of sodium salicylate to the salicylic acid non-accumulating system. The results of this test are set forth below in Table 2.

TABLE 2

| Fermentation time hours: | Salicylic acid concentration mg. per ml. |
|---|---|
| 0 | 0 |
| 18 | 6 |
| 24 | 7.8 |
| 48 | 10 |
| 72 | 5.1 |
| 90 | (¹) |
| 96 | 12.5 |
| 120 | 15.5 |
| 144 | 16.5 |
| 165 | 22 |

¹ Sodium salicylate added.

The above data indicate that the adjustment of the proportion of cells in the system to salicylic acid present in accordance with the method of the invention effectively converted the fermentation broth from a salicylic acid non-accumulating state to a state wherein salicylic acid accumulation thereafter was observed.

Example III

To determine the effects on salicylic acid production due to another manner of adjusting the composition of the fermentation broth in accordance with the method of the present invention, the general procedure of Example I again was repeated with the exception of adding slowly to the fermentation broth an aqueous "sparking" complementary nutrient solution (N) containing about 0.75% yeast extract and about 0.75% trypticase after the fermentation had run for about 48 hours, the observed salicylic acid concentration had become substantially constant, and the viable cell population of the broth was observed to be decreasing rapidly. The results obtained in this test are shown below in Table 3.

TABLE 3

| Fermentation time, hours | Total nutrient (N) added (milliliters) | Salicylic acid concentration, gm. per ml. |
|---|---|---|
| 0 | | 0 |
| 8 | | 1.4 |
| 23 | | 12.5 |
| 25 | | 13.2 |
| 32 | | 14.3 |
| 52 | 25 | 16.5 |
| 78 | 50 | 20.0 |
| 96 | 75 | 20.7 |
| 100 | | 19.5 |
| 104 | | 18.7 |
| 105 | 150 | 26.0 |

The above data demonstrate that in salicylic acid fermentations a system which is in a salicylic acid nonaccumulating state due to the presence of too great a proportion of salicylic acid as compared to the cell population may be converted to a salicylic acid accumulating state by an addition of complementary nutrient.

Example IV

In order to demonstrate the effects on salicylic acid production utilizing another technique of the present invention to effect an adjustment in the fermentation broth concentration two sets of runs were carried out in shake flasks as described above. In one set of runs employed as controls, various amounts of yeast extract were added to each of the samples and after 48 hours the salicylic acid concentrations of the resultant broths were determined. The second set of runs was otherwise identical to the first set with the exception that about 2% dry weight agar initially was added to each sample to partially absorb salicylic acid produced in the fermentation. At the end of 96 hours, the total amount of salicylic acid absorbed by the agar and present in the broths of each of these samples was determined. These results are set forth below in Table 4.

TABLE 4

| Dry agar added, percent | Yeast extract, percent | Salicylic acid, mg./ml. | | |
|---|---|---|---|---|
| | | In broth | In agar | Total |
| 2.0 | .00 | 17.0 | 5.0 | 22.0 |
| 2.0 | .01 | 15.9 | 10.1 | 26.0 |
| 2.0 | .05 | 15.5 | 6.5 | 22.0 |
| 2.0 | .10 | 14.7 | 9.3 | 24.0 |
| 2.0 | .20 | 14.7 | 9.3 | 24.0 |
| None | .00 | 16.3 | | 16.3 |
| Do | .01 | 17.0 | | 17.0 |
| Do | .05 | 17.5 | | 17.5 |
| Do | .10 | 16.5 | | 16.5 |
| Do | .20 | 16.3 | | 16.3 |

The data shown in Table 4 clearly demonstrate that an appropriate effective adjustment of the composition of the fermentation broth in accordance with the present method by a removal of salicylic acid significantly increases total salicylic acid accumulation in an adjusted system.

It will be apparent to those skilled in the art that other modifications may be made in the method of the invention without departing from the spirit thereof. Accordingly, it is understood that it is intended that the present invention be limited only by the scope of the appended claims.

The embodiments of the invention in which an exclusive property or privilege is claimed are defined as follows:

1. In the method for producing salicylic acid which comprises cultivating a microorganism which is a salicylic acid-producing strain of Pseudomonas, in an aqueous nutrient medium having a pH in the range from about 5.5 to about 8 and containing naphthalene, an assimilable nitrogen source, and an assimilable phosphorous source to produce salicylic acid in the resultant medium, wherein after the initiation of salicylic acid production the cell population of said microorganism in the fermentation medium is increasing and the rate of production of salicylic acid in the fermentation medium is not increasing, the improvement comprising increasing the proportion of salicylic acid to cell population of said organism in the medium in an amount sufficient to increase the rate of production of salicylic acid in the resultant altered fermentation medium.

2. The method in accordance with claim 1 in which the proportion of salicylic acid to cell population in the medium is increased by adding salicylic acid to the medium.

3. The method in accordance with claim 2 in which the rate of salicylic acid production in the medium is below about 0.3 milligram per milliliter per hour at the time salicylic acid is added to the medium.

4. The method in accordance with claim 3 in which the microorganism is *Pseudomonas fluorescens* and following the addition of salicylic acid to the medium the said microorganism is cultivated in the altered medium to provide a medium in which the total accumulation of salicylic acid is at least about 20 milligrams per milliliter.

5. The method in accordance with claim 1 in which the proportion of salicylic acid to cell population of said organism in the medium is increased by removing from the medium a portion of the cells of said organism.

6. The method in accordance with claim 5 in which the rate of salicylic acid production in the medium is below about 0.3 milligram per milliliter per hour at the time a portion of the cells of said organism are removed from the medium.

7. A method in accordance with claim 6 in which said microorganism is *Pseudomonas fluorescens* and following said alteration of said fermentation medium the organism is cultivated in the altered medium to provide a medium in which the total accumulation of salicylic acid is at least about 20 milligrams per milliliter.

8. In the method for producing salicylic acid which comprises cultivating a microorganism which is a salicylic acid-producing strain of Pseudomonas, in an aqueous nutrient medium having a pH in the range from about 5.5 to about 8 and containing naphthalene, an assimilable nitrogen source, and an assimilable phosphorus source to produce salicylic acid in the resultant medium, wherein after the initiation of said salicylic acid production the cell populaton of said microorganism in said medium has ceased to increase substantially, the improvement comprising decreasing the proportion of salicylic acid to cell population of said organism in said medium in an amount sufficient to increase the rate of production of salicylic acid in the resultant altered fermentation medium by effectively removing a portion of the salicylic acid from the medium.

9. The method in accordance with claim 8 in which the rate of salicylic acid production in the medium is below about 0.3 milligram per milliliter per hour at the time of salicylic acid removal.

10. The method in accordance with claim 9 in which salicylic acid is effectively removed from the medium by the addition of an adsorbent for salicylic acid to the medium.

11. The method in accordance with claim 10 in which said microorganism is *Pseudomonas fluorescens* and following said alteration of said fermentation medium said microorganism is cultivated in said altered medium to provide a medium in which total accumulation of salicylic acid is at least about 20 milligrams per milliliter.

References Cited

UNITED STATES PATENTS

| 3,183,169 | 5/1965 | Brillaud | 195—28 |
| 3,272,716 | 9/1966 | Goren et al. | 195—51 |
| 3,274,074 | 9/1966 | Zajic et al. | 195—51 |

OTHER REFERENCES

Klausmeier et al., Journal of Bacteriology, vol. 73, pp. 461–464, 1956.

LIONEL M. SHAPIRO, *Primary Examiner.*

UNITED STATES PATENT OFFICE

CERTIFICATE OF CORRECTION

Patent No. 3,420,741

January 7, 196

Martin H. Rogoff

It is certified that error appears in the above identified patent and that said Letters Patent are hereby corrected as shown below:

Column 1, line 21, "accumulate" should read -- accumulated --. Column ... line 59, "asimilable" should read -- assimilable --. Column 6, line 36, "absorbent" should read -- adsorbent --. Column 7, line 17, "by" should read -- in --. Column 9, TABLE 3, in the heading to the table, third column, line 2 thereof, "gm." should read -- mg. --.

Signed and sealed this 17th day of March 1970.

(SEAL)

Attest:

Edward M. Fletcher, Jr.
Attesting Officer

WILLIAM E. SCHUYLER, JR
Commissioner of Patents